Figure 1:
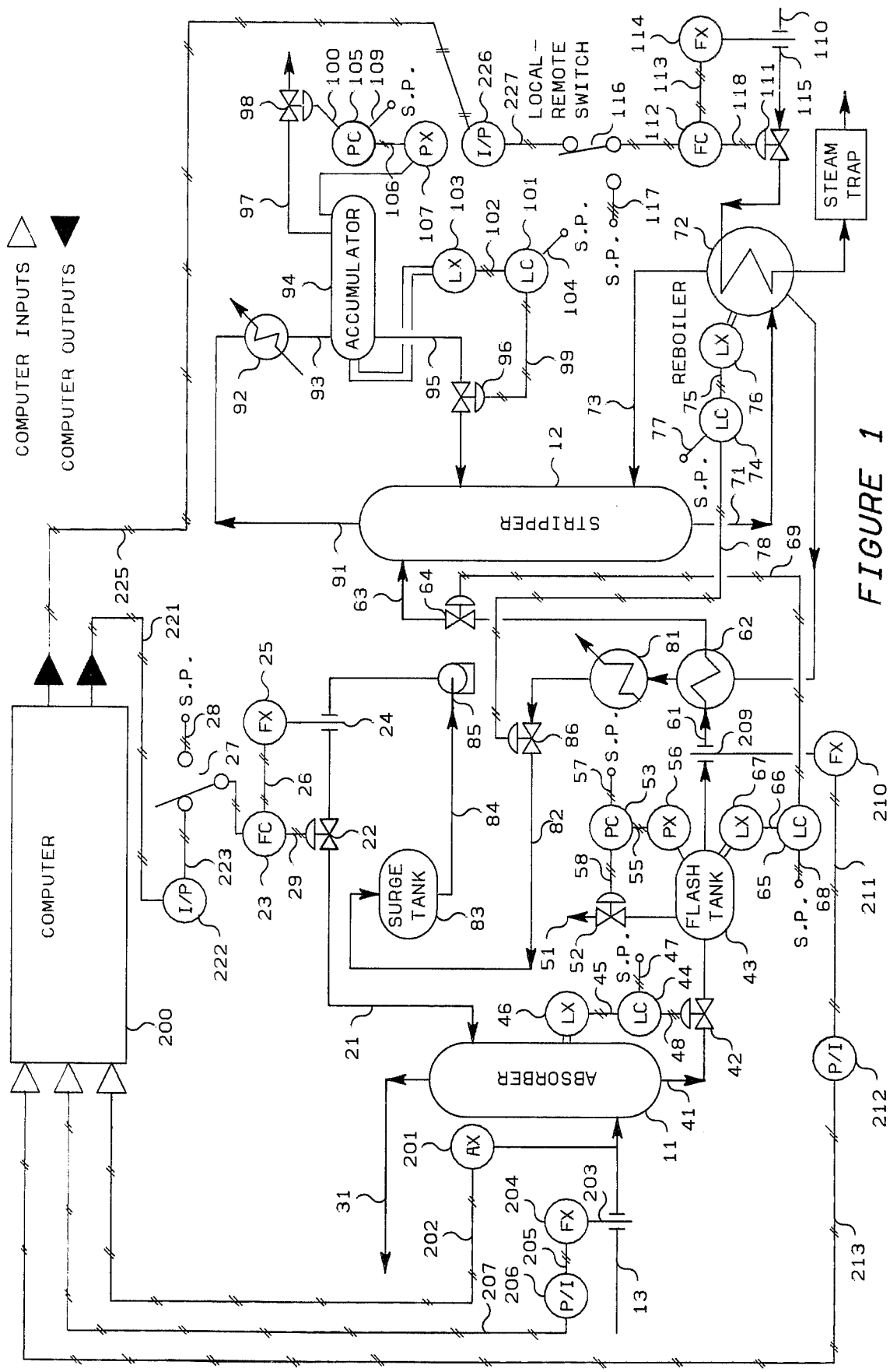

United States Patent [19]

Tuckett et al.

[11] 4,106,916
[45] Aug. 15, 1978

[54] AUTOMATIC CONTROL OF AN ABSORPTION/STRIPPING PROCESS

[75] Inventors: William F. Tuckett; Gary L. Funk; Dexter E. Smith, all of Bartlesville, Okla.

[73] Assignee: Phillips Petroleum Company, Bartlesville, Okla.

[21] Appl. No.: 823,368

[22] Filed: Aug. 10, 1977

[51] Int. Cl.² ............................................ B01D 53/14
[52] U.S. Cl. .......................................... 55/21; 55/48; 55/49; 55/73; 55/164; 55/208; 55/227; 55/228; 196/132; 423/228; 423/243
[58] Field of Search ................. 55/18, 21, 48, 49, 50, 55/73, 89, 160, 164, 208, 222, 227, 228, 338; 196/132; 423/228, 229, 243

[56] References Cited

U.S. PATENT DOCUMENTS

| | | | |
|---|---|---|---|
| 3,216,177 | 11/1965 | Bracken et al. | 55/48 X |
| 3,239,457 | 3/1966 | Heckart | 196/132 X |
| 3,338,664 | 8/1967 | Bally et al. | 423/228 |
| 3,352,631 | 11/1967 | Zarker | 423/229 |
| 3,446,709 | 5/1969 | Marshall | 196/132 |
| 3,958,943 | 5/1976 | Carmassi et al. | 423/228 X |
| 3,967,937 | 7/1976 | Hobbs | 55/48 X |

FOREIGN PATENT DOCUMENTS 2,634,491  3/1977  Fed. Rep. of Germany ............ 55/18
257,449  1/1971  U.S.S.R. ........................................ 55/48

Primary Examiner—Charles N. Hart
Assistant Examiner—Robert H. Spitzer

[57] ABSTRACT

The flow rate of the absorption medium entering an absorption column and the flow rate of steam into a reboiler associated with a stripping column are controlled in response to the flow rate of a feed stream into the absorption column, the concentration of impurities in the feed stream, and the flow rate of the absorption medium containing the impurity removed from the feedstream into the stripping column in such a manner that the efficiency of the absorption process is optimized. A computer system is utilized to simulate the flow of materials inside the absorption and stripping columns. Feed forward control, based on the simulations, is utilized to maximize the energy efficiency of the absorption/stripping process by reducing the amount of steam required by the stripping process and reducing the energy consumption of the pumping system utilized to return the absorption medium to the absorption column.

23 Claims, 2 Drawing Figures

AUTOMATIC CONTROL OF AN ABSORPTION/STRIPPING PROCESS

This invention relates to an absorption process for the separation of impurities from a desired product material. In one aspect this invention relates to an apparatus and method for optimizing the operation of the absorption process. In another aspect this invention relates to a method and apparatus for simulating the absorption process and providing feed forward control of the absorption process based on the computer simulation to provide maximum energy savings.

The absorption process for the separation of impurities from a desired product material utilizes an absorption material to remove the impurities. The separation of the impurities need not be complete; generally a product has to be supplied, which meets a certain specification and therefore does not contain more impurities than corresponds with the limits mentioned in the specification.

The purified desired product and the absorption medium containing the impurities are withdrawn from the absorption column. The absorption medium containing the impurities is regenerated by passing it to a stripping column in which it is at least substantially freed from the impurities by heating. The regenerated absorption material is returned to the absorption column to be used to again remove impurities from the feed material.

The concentration of the impurities in the product material is determined by both the flow rate of the absorption medium into the absorption column and the concentration of impurities in the absorption medium entering the absorption column. The concentration of impurities in the absorption medium is determined by the level of the heat used to separate the impurities from the absorption medium in the stripping column. In typical absorption processes both the flow rate of the absorption medium into the absorption column and the heat input to the stripping column are set and held sufficiently high to maintain satisfactory operation for worst case conditions. This results in the use of excess energy when the concentration of impurities in the feed material is less than the worst case.

Accordingly, it is an object of this invention to provide an apparatus and method for controlling an absorption process. Another object of this invention is to provide an apparatus and method for optimizing the operation of the absorption process. Yet another object of this invention is to provide a method and apparatus for simulating the absorption process and providing feed forward control of the absorption process based on the computer simulation to provide maximum energy savings.

In accordance with the present invention, a method and apparatus is provided for controlling an absorption process by providing measurements of the flow rate of the feed material into the absorption column, the concentration of impurities in the feed material flowing into the absorption column, and the flow rate of the absorption medium containing the impurities into the stripping column, to a computing means. The computing means calculates the required flow rate of the absorption medium into the absorption column and also calculates the required reboiler heat associated with the stripping column. Signals representative of these calculated values are then used to control the absorption process. In this manner the energy consumption of the stripping column reboiler and the energy consumption of the pumping system utilized to return the absorption medium to the absorption column is reduced and the absorption process operates at maximum efficiency.

Figure 2:
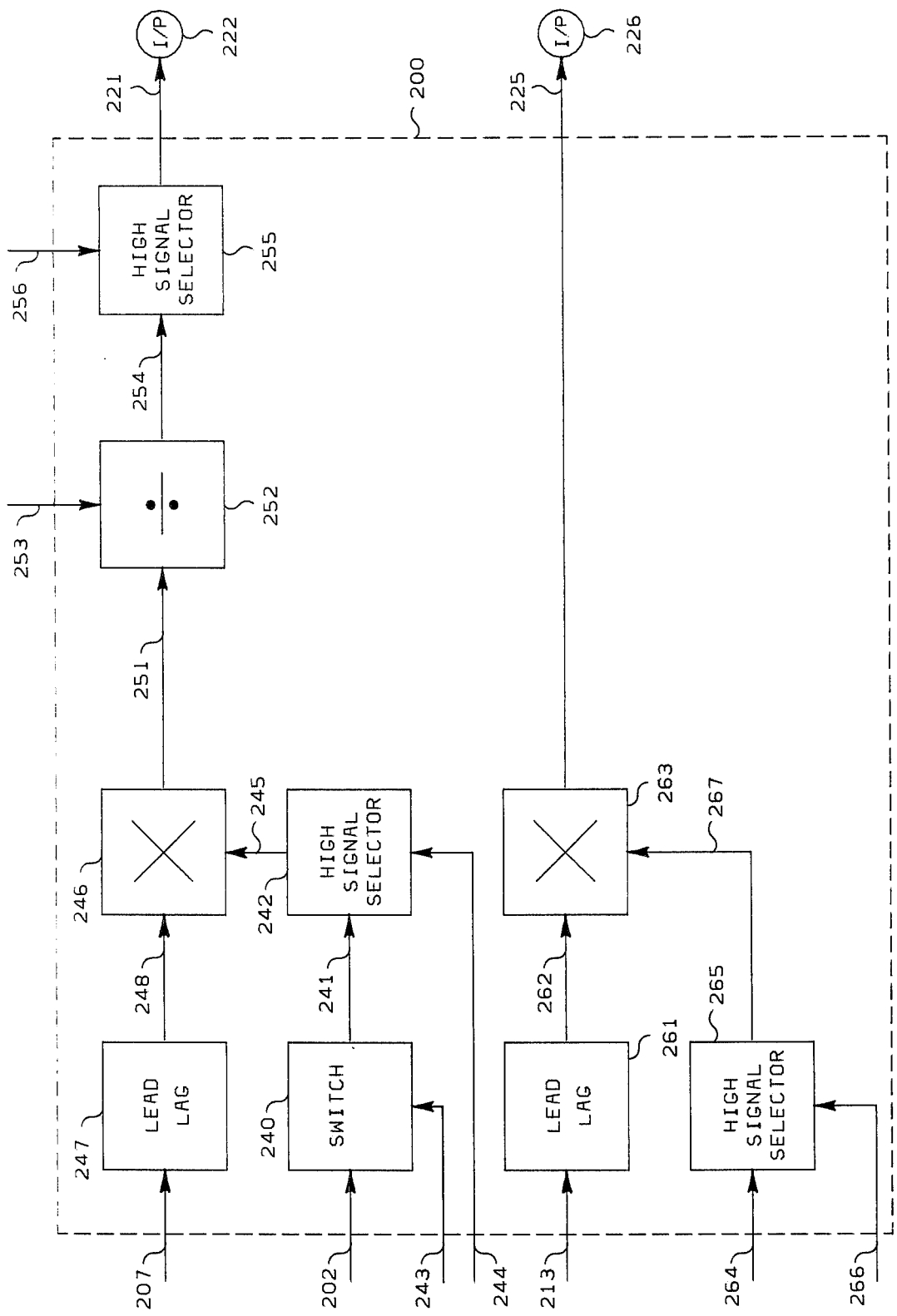

Additional objects and advantages of the invention will be apparent from the following description of a preferred embodiment of the invention as illustrated by the drawings in which:

FIG. 1 is a representation of an absorption/stripping process, utilized in the removal of acid gases from a feed gas such as natural gas, with the associated means for controlling the absorption/stripping process; and FIG. 2 is a schematic representation of the computer logic utilized in controlling the absorption/stripping process.

For the sake of simplicity the invention is illustrated and described in terms of a specific absorption process commonly called a gas sweetening process. The gas sweetening process involves purifying natural gas of acid gases such as $H_2S$ and $CO_2$. This process is utilized in gasoline plants, natural gas liquidification plants, refineries and petrochemical plants.

Although the invention is illustrated and described in terms of a specific absorption process, the applicability of the use of the invention described herein extends to other absorption processes and similar chemical processes. Lines designated as signal lines in the drawings can be electrical, pneumatic, mechanical, hydraulic, or other signal means for transmitting information. In almost all control systems some combination of these type of signals will be utilized. However, use of any other type of signal transmission, compatible with the process and equipment in use, is within the scope of the invention.

Referring now to the drawings and in particular to FIG. 1 an absorption process is illustrated having an absorption column 11 and a stripping column 12. A feed gas to be purified of acid gases such as $H_2S$ or $CO_2$ enters the absorption column 11 through a feed gas conduit 13. An absorption medium capable of absorbing the acid gases (such as an aqueous solution of diisopropanol amine), referred to hereafter as lean absorption medium, enters the absorption column 11 through an absorption medium conduit mean 21. The flow of the lean absorption medium through conduit means 21 is regulated by pneumatic control valve 22 located in conduit means 21. Inside the absorption column 11 the feed material is contacted by the lean absorption medium. The lean absorption medium absorbs the acid gases in the feed material. The purified feed gas is removed from an upper portion of the absorption column through conduit means 31. The absorption medium containing dissolved acid gases, referred to hereafter as rich absorption medium, accumulates at the bottom of the absorption column 11 and is removed from a lower portion of the absorption column through the absorber bottom conduit means 41. Pneumatic control valve 42 located in conduit means 41 controls the rate at which the rich absorption medium is removed from the absorption column 11 to the flash tank 43. In the flash tank 43 the pressure of the rich absorption medium is reduced by venting a portion of the vapor associated with the rich absorption medium through vapor conduit means 51. The rate at which the vapor is vented through conduit means 51 is controlled by pneumatic control valve 52 located in vapor conduit 51. The rich absorption medium is fed from the flash tank 43 through conduit means 61 to a heat exchanger 62. The rich absorption medium is heated in heat exchanger 62 and is then fed through conduit means 63 into an upper portion of the stripping column 12. The flow of the heated rich absorption medium from the heat exchanger 62 to the stripping column is controlled by pneumatic control valve 64 located in conduit means 63. In the stripping column 12 the acid gases absorbed in the absorption medium are separated, at least partially, from the rich absorption medium. The lean absorption medium which still contains some acid gases accumulates at the bottom of the stripping column 12 and is removed to a reboiler 72 through absorption medium conduit 71.

The lean absorption medium is heated to some desired temperature in order to further strip the remaining acid gases from the lean absorption medium until the concentration of acid gases in the absorption medium is reduced to some desired low level. The stripping process need not be total but must be sufficient to assure that the lean absorption medium is suitable for reuse in the absorption column.

The heat supplied by the reboiler 72 to the lean absorption medium which still contains some acid gases is determined by the quantity of steam or other suitable heat exchanging medium flowing to the reboiler 72 through conduit means 110. The flow of steam to the reboiler is manipulated by pneumatic control valve 111 located in conduit means 110.

The acid gases stripped from the lean absorption medium in the reboiler 72 are returned to an intermediate portion of stripping column 12 through conduit means 73. The lean absorption medium flows from reboiler 72 through conduit means 80 to heat exchangers 62 and 81 where it is cooled. The lean absorption medium then flows through conduit means 82 to surge tank 83 where it is pumped through conduit means 84 by means of pump 85 into conduit means 21 and thus into absorption column 11. The acid gases separated from the rich absorption medium in stripping column 12 and reboiler 72 are removed from the stripping column 12 and passed through the stripper overhead conduit 91 and a cooling heat exchanger 92 to at least partially condense the vaporous material. The partially condensed material is passed via a conduit means 93 to the stripper overhead accumulator 94. Condensate is removed from the stripper overhead accumulator 94 and returned to the stripper column by conduit means 95 and its associated control valve 96 as reflux. Acid gases are removed from stripper overhead accumulator 94 through conduit means 97 and its associated control valve 98 for use in other processes or for disposal.

In general, each of the streams entering or leaving each column or apparatus is controlled in some way either by computer means or by some other method of control.

The flow rate of the rich absorption medium leaving the bottom of absorption column 11 through absorber bottom conduit 41 is controlled by control valve 42 in response to signal 48 representative of a comparison by level controller 44 of signal 45 representative of the actual liquid level in absorber column 11 as measured by liquid level transducer 46 and a set point signal 47 representative of the desired liquid level in the bottom portion of the absorption column 11.

The flow of vapor from flash tank 43 through conduit means 51 is controlled by pneumatic control valve 52 in response to signal 58 representative of a comparison by pressure controller 53 of signal 55 representative of the actual pressure in the flash tank 43 as measured by pressure transmitter 56 and set point signal 57 representative of the desired pressure in flash tank 43.

The flow of the rich absorption medium from the flash tank 43 to the stripping column 12 through conduits 61 and 63 is controlled by pneumatic control valve 64 in response to signal 69 representative of a comparison by level controller 65 of signal 66 representative of the actual liquid level in flash tank 43 as measured by level transducer 67 and a set point signal 68 representative of the desired liquid level in flash tank 43.

The flow of the lean absorption medium from reboiler 72 to surge tank 83 through conduits 80 and 82 is controlled by pneumatic control valve 86 in response to signal 78 representative of a comparison by level controller 74 of signal 75 representative of the actual liquid level in reboiler 72 as measured by level transducer 76 and a set point signal 77 representative of the desired liquid level in reboiler 72.

The flow of reflux from the stripper overhead accumulator 94 to stripping column 12 through conduit 95 is controlled by pneumatic control valve 96 in response to signal 99 representative of a comparison by level controller 101 of signal 102 representative of the actual liquid level in stripper overhead accumulator 94 as measured by level transducer 103 and a set point signal 104 representative of the desired liquid level in stripper overhead accumulator 94.

The flow of the acid gases out of the stripper overhead accumulator 94 through conduit means 97 is controlled by pneumatic control valve 98 in response to signal 100 representative of a comparison by pressure controller 105 of signal 106 representative of the actual pressure in the stripper overhead accumulator 94 as measured by pressure transmitter 107 and a set point signal 109 representative of the desired pressure in overhead accumulator 94.

Control of the total absorption process is accomplished by using a computer means 200 to dynamically simulate the absorption process based on certain process parameters input to the computer. Feed forward control of the flow rate of the lean absorption medium into the absorption column 11 and the flow rate of steam into the reboiler 72 is based on the simulation.

Flow sensor 203, located in conduit means 13, in conjunction with flow transducer 204 measures the flow rate of the feed gas entering the absorption column 11. Signal 205 representative of the flow rate of the feed gas is converted from a pneumatic signal to a current signal by pressure-to-current transducer 206. Signal 207 from transducer 206 provides the computer means 200 with the measured feed gas flow rate.

Analyzer transducer 201 measures the concentration of acid gases in the feed gas flowing into the absorption column 11. Signal 202 representative of the measured concentration of acid gases in the feed gas is provided as an input to computer means 200.

Flow sensor 209, located in conduit means 61, in conjunction with flow transducer 210 measures the flow rate of the rich absorption medium flowing into the stripping column 12. Signal 211 representative of the measured flow rate is converted from a pneumatic signal to a current signal by pressure-to-current transducer 212. Signal 213 from transducer 212 provides the computer means 200 with the measured flow rate of the rich absorption medium flowing into the stripping column as an input.

The three described input signals to the computer means 200, the measured flow rate of the feed gas into the absorption column 11, the measured concentration of acid gases in the feed gas, and the measured flow rate of the rich absorption medium into the stripping column 12, are utilized to compute the required flow rate of the lean absorption medium into the absorption column and the required flow rate of steam into the reboiler 72. Output signal 221 from computer means 200 is representative of the required flow rate of the lean absorption medium into the absorption column. Signal 221 is converted to a pneumatic signal 223 by current-to-pressure transducer 222. The flow rate of the lean absorption medium into the absorption column 11 is controlled by pneumatic control valve 22 in response to signal 29 representative of a comparison by flow controller 23 of signal 223, representative of the required flow rate of the lean absorption medium, and signal 26, representative of the actual flow rate of the lean absorption medium as measured by flow sensor 24, located in conduit means 21, in conjunction with flow transducer 25. Provision is made for manual control of the flow rate of the lean absorption medium by placing switch 27 in the manual set point position. Manual set point 28 is representative of the required flow rate of the lean absorption medium into the absorption column 11 as determined by an outside operator.

Output signal 225 is representative of the required flow rate of steam into the reboiler 72. Signal 225 is converted to a pneumatic signal 227 by current-to-pressure transducer 226. The flow of steam into the reboiler 72 is controlled by pneumatic control valve 111 located in steam conduit 110 in response to signal 118 representative of a comparison by flow controller 112 of signal 227, representative of the required flow rate of steam into the reboiler, and signal 113, representative of the actual flow rate of steam into the reboiler 72 as measured by flow sensor 115 in conjunction with flow transducer 114. Provision is also made for manual control of the steam flow rate by placing switch 116 in the manual set point position. Manual set point 117 is representative of the required flow rate of steam into the reboiler as determined by an outside operator.

Although the invention is illustrated in conjunction with the apparatus of the absorption column 11 and the stripping column 12 as previously described, the invention is equally applicable to similar systems utilizing different equipment arrangements. For example, each of the columns can in actuality be a plurality of columns connected to perform the function of a single larger column. Likewise, the reboiling zone associated with the stripping column can be incorporated into the bottom of the absorbing column rather than being external as illustrated. There is additional conventional equipment such as pumps, valves, heat exchangers and other conventional equipment associated with the schematically illustrated process which have not been specifically illustrated in FIG. 1 but are known by those skilled in the art to be a part of the process such as the one illustrated.

The unique aspect of this invention lies in how the computer system uses dynamic simulation of the absorption process to provide feed forward control of the two interacting and coupled columns. The inputs required by the computer, the logic used by the computer, and the outputs derived from the computer are shown in FIG. 2 for a presently preferred embodiment.

Referring to FIG. 2, signal 202 representative of the concentration of acid gases in the feed gas is supplied through switching means 240 to high signal selector 242. Switching means 240 may be utilized to supply the high signal selector 242 with a set point signal 243 representative of the estimated concentration of acid gases in the feed gas if signal 202 is not available. High signal selector 242 is also provided with low limit set point signal 244. Low limit signal 244 is representative of the lowest value that the concentration of acid gases in the feed gas can approach. Use of low limit signal 244 protects against malfunctions in the process for measuring the concentration of acid gases in the feed gas. Signal 245 representative of the higher of signals 241 and 244 is supplied from high signal selector 242 to multiplying means 246.

Signal 207 representative of the measured feed gas flow rate to the absorption column is supplied to lead-lag means 247. Lead-lag means 247 utilizes time delay and differentiation to simulate the flow rate of the feed gas inside the absorption column. Use of lead-lag means in this manner is well known in control systems art. Signal 248 representative of the flow rate of the feed gas inside the absorption column is supplied from lead-lag means 247 to multiplying means 246. Multiplying means 246 multiplies signal 245 by signal 248 to produce signal 251 representative of the quantity of acid gases flowing in the absorption column.

Signal 251 is supplied to dividing means 252 by multiplying means 246. Dividing means 252 is also provided with a set point signal 253 representative of the quantity of lean absorption medium required to absorb a given quantity of acid gases. Dividing means 252 divides signal 253 into signal 251 and produces signal 254 representative of the required flow of the lean absorption medium necessary to absorb some desired proportion of the acid gases flowing in the absorption column 11.

Signal 254 is supplied to high signal selector 255. High signal selector 255 is also supplied with a set point signal 256 representative of the lowest limit for the lean absorption medium flow rate. Set point signal 256 is based on estimates of the lowest possible molar flow rate of impurities entering the absorption column during normal operation. High signal selector 255 produces signal 221 representative of the higher of signals 254 and 256. Use of set point signal 256 protects against malfunctions in the calculation of signal 254. Computer output signal 221 representative of the required flow rate of the lean absorption medium into the absorption column is then supplied to current-to-pressure transducer 222 and is utilized as previously described in FIG. 1.

Signal 213 representative of the flow rate of the rich absorption medium into the stripping column is supplied to lead-lag means 261. Lead-lag means 261 utilizes time delay and differentiation functions to simulate the flow of the rich absorption medium inside the stripping column. Signal 262 representative of the flow rate of the rich absorption medium inside the stripping column is supplied from lead-lag means 261 to multiplying means 263.

High signal selector 265 is supplied with a stripping factor set point signal 264 representative of the quantity of steam required to strip a given quantity of the rich absorption medium of acid gases. High signal selector 265 is also supplied with set point signal 266 representative of the lowest quantity of steam required to strip a given quantity of the rich absorption medium of acid gases. The value of signal 264 is determined by an outside operator and may be varied. Signal 266 is a constant and is simply provided to provide protection against operator errors. High signal selector 265 compares signals 264 and 266 and produces signal 267 representative of the quantity of steam required to strip a given quantity of the rich absorption medium of acid gases. Signal 267 is supplied from high signal selector 265 to multiplying means 263.

Signals 262 and 267 are multiplied by multiplying means 263 to produce signal 225 representative of the required flow rate of steam necessary to assure that a sufficient quantity of acid gases will be removed from the rich absorption medium in the stripping column. Computer output signal 225 is supplied to current-to-pressure transducing means 226 and is utilized as it was previously described for FIG. 1.

It should be noted that set point signals 243, 244, 253, 256, 264 and 266 described above are all based on an engineering analysis of the absorption/stripping process. Any suitable signal generating means may be utilized to supply these set point signals to the computer means 200.

The invention has been described in terms of its presently preferred embodiment as shown in FIG. 1. Specific components which can be used in the practice of the invention as shown in FIG. 1 are as follows:

| | |
|---|---|
| Controller 23, 53, 105 and 112 | Model 1412 RA51000 Taylor Instrument Co. Rochester, N. Y. |
| Level controller 44, 65, 74, and 101 | Foxboro Model 62 Foxboro Co. |
| Flow sensor 24, 115, 203, and 209 | A78 Orifice Plate and Flange Foxboro Co. Foxboro, Mass. |
| Flow transducer, 25, 114, 204, and 210 | A94 Air Operated Differential Pressure Cell Foxboro Co. Foxboro, Mass. |
| Pressure transmitter 56 and 107 | Model EG11Gm Electronic Gage Pressure Transmitter Foxboro Co. |
| Level transducer 46, 67, 76 and 103 | Foxboro-Electronic Level Transmitter Model E17DM |
| Control valve 111 | Stabilflo Valve No. A218 Foxboro Co. Foxboro, Mass. |
| Control valve 22, 42, 64, 86, 96 and 98 | No. A240 Foxboro Co. Foxboro, Mass. |
| Analyzer transducer 201 | 102 Process Chromatograph System App. Auto. |
| Computer means 200 | Optrol A 402 Applied Automation Bartlesville, OK |

Lag-lead means 247 and 261, high signal selector means 242, 255, and 265, switching means 240, multiplying means 246 and 263, and dividing means 252 illustrated in FIG. 2 are all supplied on cards which are part of the Optrol A 402 computer system manufactured by Applied Automation, Bartlesville, Oklahoma.

While the invention has been described in terms of the presently preferred embodiments, reasonable variations and modifications are possible, by those skilled in the art, within the scope of the described invention and the appended claims.

That which is claimed is:

1. Apparatus comprising:
   an absorption column means for removing an impurity from a desired product material;
   means for passing a feed stream containing said desired product material and said impurity into said absorption column means;
   means for passing a stream of lean absorption medium, suitable for removing said impurity from said feed stream, into said absorption column means;
   means for removing a purified desired product material from an upper portion of said absorption column means as an absorber overhead product;
   means for removing the rich absorption medium containing the absorbed impurity from a bottom portion of said absorption column means;
   stripping column means and associated reboiler means for purifying said rich absorption medium by stripping at least a portion of said absorbed impurity from said rich absorption medium to produce lean absorption medium;
   means for passing said rich absorption medium into said stripping column means and associated reboiler means;
   means for passing a heat exchanging medium stream through said reboiler means;
   means for establishing a first signal, representative of the flow rate of said heat exchanging medium stream flowing through said reboiler means;
   means for establishing a second signal, representative of the flow rate of said rich absorption medium flowing into said stripping column means;
   means for establishing a third signal, representative of the quantity of said heat exchanging medium required to strip a given quantity of said impurity from said rich absorption medium;
   means for producing, in response to said second and third signals, a fourth signal, representative of the required flow rate of said heat exchanging medium necessary to assure that a sufficient quantity of said impurity is removed from said rich absorption medium by said stripping column means;
   means for comparing said first signal and said fourth signal and for producing a fifth signal representative of this comparison;
   means for manipulating the flow rate of said heat exchanging medium to said reboiler means in response to said fifth signal, thereby regulating the stripping process;
   means for removing the thus stripped impurity from an upper portion of said stripping column means as a stripping column overhead stream;
   means for removing the lean absorption medium from said stripping column means and passing the removed lean absorption medium to said means for passing a stream of lean absorption medium into said absorption column means to use the thus removed lean absorption medium in absorbing said impurity in said feed stream;
   means for establishing a sixth signal representative of the actual flow rate of said lean absorption medium flowing into said absorption column means;
   means for establishing a seventh signal representative of the flow rate of said feed stream into said absorption column means;
   means for establishing an eighth signal representative of the concentration of said impurity in said feed stream;
   means for establishing a ninth signal representative of the quantity of said lean absorption medium required to absorb a given quantity of said impurity;
   means for producing, in response to said seventh, eighth and ninth signals, a 10th signal, representative of the required flow rate of said lean absorption medium into said absorption column means;

means for comparing said sixth signal and said tenth signal and for producing an 11th signal representative of this comparison; and means for manipulating the flow rate of said lean absorption medium into said absorption column means in response to said 11th signal, thereby controlling the absorption process.

2. Apparatus in accordance with claim 1 wherein said means for establishing said first, second, sixth and seventh signals is a flow sensing means and an associated transducer means.

3. Apparatus in accordance with claim 1 wherein said means for producing said fourth signal and said 10th signal is a computer means.

4. Apparatus in accordance with claim 3 wherein said computer means comprises:
first lead-lag network means for producing a 12th signal, representative of the flow rate of said rich absorption medium inside said stripping column means, in response to said second signal;
means for multiplying said 12th signal by said third signal to produce said fourth signal;
second lead-lag network means for producing a 13th signal representative of the flow rate of said feed stream inside said absorption column means in response to said seventh signal;
means for multiplying said 13th signal by said eighth signal to produce a 14th signal representative of the quantity of said impurity flowing inside said absorption column means; and
means for dividing said 14th signal by said ninth signal to produce said tenth signal.

5. Apparatus in accordance with claim 1 wherein said means for producing said fifth signal and said 11th signal is a flow controller means.

6. Apparatus in accordance with claim 1 wherein said means for establishing said eighth signal is a chemical analysis means and an associated transducer means.

7. Apparatus in accordance with claim 1 additionally comprising:
means for manipulating the flow rate of said rich absorption medium out of said bottom portion of said absorption column means;
means for reducing the vapor pressure of said rich absorption medium by venting a portion of the vapor associated with said rich absorption medium from flash tank means;
means for manipulating said venting of a portion of said vapor associated with said rich absorption medium from said flash tank means;
first heat exchanger means for heating said rich absorption medium;
means for passing said rich absorption medium from said means for removing the rich absorption medium from said bottom portion of said absorption column means through said flash tank means and said first heat exchanger means to said means for passing said rich absorption medium into said stripping column means and associated reboiler means;
means for manipulating the flow rate of said rich absorption medium into said stripping column means;
second heat exchanging means for cooling and at least partially condensing said stripping column overhead stream;
accumulator means for storing said partially condensed stripping column overhead stream;
means for passing said stripping column overhead stream from said means for removing said stripping column overhead stream from said stripping column means through said second heat exchanging means to said accumulator means;
means for venting at least a portion of the vapors associated with said partially condensed stripping column overhead stream from said accumulator means;
means for manipulating said venting of a portion of said vapors from said accumulator means;
means for removing a portion of the condensate associated with said partially condensed stripping column overhead stream from said accumulator means and returning said condensate to said stripping column means as reflux;
means for manipulating the flow rate of said condensate into said absorption column means;
third heat exchanger means for cooling said lean absorption medium;
surge tank means for storing said lead absorption medium;
means for passing said lean absorption medium from said means for removing said lean absorption medium from said stripping column means through said third heat exchanger means to said surge tank means;
means for manipulating the flow rate of said rich absorption medium into said surge tank means;
pumping means for removing the lean absorption medium from said surge tank means; and
means for passing said lean absorption medium from said surge tank means through said pumping means to said means for passing a stream of lean absorption medium into said absorption column means.

8. Apparatus in accordance with claim 7 wherein said means for manipulating the flow rate of said rich absorption medium out of said bottom portion of said absorption column means comprises:
level transducer means for measuring the level of said rich absorption medium accumulated in said bottom portion of said absorption column means and for producing a 12th signal representative thereof;
means for establishing a 13th signal representative of the desired level of said rich absorption medium accumulated in said bottom portion of said absorption column means;
level controller means for comparing with 12th signal and said 13th signal and for producing a 14th signal representative of that comparison; and
control valve means for manipulating the flow rate of said rich absorption medium out of said bottom portion of said absorption column means in response to said 14th signal.

9. Apparatus in accordance with claim 7 wherein said means for manipulating the venting of a portion of said vapor associated with said rich absorption medium from said flash tank means comprises:
pressure transmitter means for measuring the vapor pressure of said rich absorption medium in said flash tank means and for producing a 12th signal representative thereof;
means for establishing a 13th signal representative of the desired vapor pressure of said rich absorption medium in said flash tank means;
pressure controller means for comparing said 12th signal and said 13th signal and for establishing a 14th signal representative of that comparison; and control valve means for manipulating the venting of a portion of said vapor associated with said rich absorption medium from said flash tank means in response to said 14th signal.

10. Apparatus in accordance with claim 7 wherein said means for manipulating the flow rate of said rich absorption medium into said stripping column means comprises:
   level transducer means for measuring the level of said rich absorption medium in said flash tank means and for producing a 12th signal representative thereof;
   means for establishing a 13th signal representative of the desired level of said rich absorption medium in said flash tank means;
   level controller means for comparing said 12th signal and said 13th signal and for establishing a 14th signal representative of that comparison; and
   control valve means for manipulating the flow rate of said rich absorption medium into said stripping column means in response to said 14th signal.

11. Apparatus in accordance with claim 7 wherein said means for manipulating the venting of a portion of said vapors from said accumulator means comprises:
   pressure transmitter means for measuring the vapor pressure of said partially condensed stripping column overhead stream in said accumulator means and for producing a 12th signal representative thereof;
   means for establishing a 13th signal representative of the desired vapor pressure of said partially condensed stripping column overhead stream in said accumulator means;
   pressure controller means for comparing said 12th signal and said 13th signal and for establishing a 14th signal representative of that comparison; and
   control valve means for manipulating the venting of a portion of said vapor associated with said partially condensed stripping column overhead stream from said accumulator means in response to said 14th signal.

12. Apparatus in accordance with claim 7 wherein said means for manipulating the flow rate of said condensate into said absorption column means comprises:
   level transducer means for measuring the level of said condensate in said accumulator means and for producing a 12th signal representative thereof;
   means for establishing a 13th signal representative of the desired level of said condensate in said accumulator means;
   level controller means for comparing said 12th signal and said 13th signal and for establishing a 14th signal representative of that comparison; and
   control valve means for manipulating the flow rate of said condensate into said stripping column means.

13. Apparatus in accordance with claim 7 wherein said means for manipulating the flow rate of said rich absorption medium into said surge tank means comprises:
   level transducer means for measuring the level of said absorption medium in said reboiler means and for producing a 12th signal representative thereof;
   means for establishing a 13th signal representative of the desired level of said lean absorption medium in said reboiler means;
   level controller means for comparing said 12th signal and said 13th signal and for establishing a 14th signal representative of that comparison; and
   control valve means for manipulating the flow rate of said lean absorption medium into said surge tank means.

14. A method of operating an absorption process and a stripping process wherein an impurity constituent of a feed material is absorbed by an absorption medium, said method comprising:
   passing a feed stream containing a desired product material and an impurity into an absorption zone to therein remove the impurity from said desired product material by utilizing a suitable lean absorption medium to absorb said impurity;
   removing from an upper portion of said absorption zone an absorber overhead product comprising said desired product material and having a concentration of said impurity which is less than the concentration of said impurity in said feed stream;
   removing the rich absorption medium containing the absorbed impurity from a bottom portion of said absorption zone and passing said rich absorption medium into a stripping zone to therein remove said absorbed impurity from the absorption medium;
   passing a heat exchanging medium stream to said stripping zone to provide reboiling heat;
   measuring the flow rate of said heat exchanging medium stream and producing a first signal representative thereof;
   measuring the flow rate of said rich absorption medium into said stripping zone and producing a second signal representative thereof;
   establishing a third signal, representative of the quantity of said heat exchanging medium required to strip a given quantity of said impurity from said rich absorption medium;
   producing, in response to said second and third signals, a fourth signal, representative of the required flow rate of said heat exchanging medium necessary to assure that a sufficient quantity of said impurity is removed from said rich absorption medium in said stripping zone;
   comparing said first signal and said fourth signal and producing a fifth signal responsive to the difference therebetween;
   regulating the stripping process by manipulating the flow rate of said heat exchanging medium to said stripping zone in response to said fifth signal;
   removing the thus stripped impurity from an upper portion of said stripping zone as a stripping zone overhead stream;
   removing the resulting lean absorption medium from said stripping zone and passing the thus removed lean absorption medium into said absorption zone to be used in absorbing said impurity in said feed stream;
   measuring the actual flow rate of said lean absorption medium flowing into said absorption zone and producing a sixth signal representative thereof;
   measuring the flow rate of said feed stream into said absorption zone and producing a seventh signal representative thereof;
   measuring the concentration of said impurity in said feed stream and producing an eighth signal representative thereof;
   establishing a ninth signal representative of the quantity of said lean absorption medium required to absorb a given quantity of said impurity;

producing, in response to said seventh, eighth and ninth signals, a 10th signal, representative of the required flow rate of said lean absorption medium into said absorption zone;

comparing said sixth signal and said 10th signal and producing an 11th signal responsive to the difference therebetween;

controlling the absorption process by manipulating the flow rate of said lean absorption medium into said absorption zone in response to said 11th signal.

15. A method in accordance with claim 14 wherein said method for establishing said third signal and said ninth signal comprises:

deriving the values of said third and said ninth signals from an engineering analysis of said absorption process and said stripping process; and utilizing a suitable signal generating means to transmit said third and said ninth signals.

16. A method in accordance with claim 14 wherein said method for producing said fourth signal and said tenth signal comprises:

providing said second signal to a first lead-lag network and utilizing said first lead-lag network to produce a 12th signal, representative of the flow rate of said rich absorption medium inside said stripping zone, in response to said second signal;

multiplying said 12th signal by said third signal to produce said fourth signal;

providing said seventh signal to a second lead-lag network and utilizing said second lead-lag network to generate a 13th signal representative of the flow rate of said feed stream inside said absorption zone in response to said seventh signal;

multiplying said 13th signal by said eighth signal to produce a 14th signal representative of the quantity of said impurity flowing inside said absorption zone; and dividing said 14th signal by said ninth signal to produce said 10th signal.

17. A method in accordance with claim 14 additionally comprising:

manipulating the flow rate of said rich absorption medium out of said bottom portion of said absorption zone;

utilizing a flash tank means to reduce the vapor pressure of said rich absorption medium by venting a portion of the vapor associated with said rich absorption medium from said flash tank means;

manipulating said venting of a portion of said vapor associated with said rich absorption medium from said flash tank means;

utilizing a first heat exchanger means to heat said rich absorption medium;

passing said rich absorption medium from said bottom portion of said absorption zone through said flash tank means and said first heat exchanger means to said stripping zone;

manipulating the flow rate of said rich absorption medium into said stripping zone;

utilizing a second heat exchanging means to at least partially condense said stripping zone overhead stream;

utilizing an accumulator means to store said partially condensed stripping zone overhead stream;

passing said stripping zone overhead stream from said stripping zone through said second heat exchanger means to said accumulator means;

venting at least a portion of the vapor associated with said partially condensed stripping zone overhead stream from said accumulator means;

manipulating said venting of a portion of said vapors from said accumulator means;

removing a portion of the condensate associated with said partially condensed stripping zone overhead stream from said accumulator means and returning said condensate to said stripping zone as reflux;

manipulating the flow rate of said condensate into said absorption zone;

utilizing a third heat exchanger to cool said lean absorption medium;

utilizing a surge tank means for storing said lean absorption medium;

passing said lean absorption medium from said stripping zone through said third heat exchanger means to said surge tank means;

manipulating the flow rate of said rich absorption medium into said surge tank means;

utilizing a pumping means to remove the lean absorption medium from said surge tank; and passing said lean absorption medium from said surge tank means through said pumping means to said absorption zone.

18. A method in accordance with claim 17 wherein said method for manipulating the flow rate of said rich absorption medium out of said bottom portion of said absorption zone comprises:

utilizing a level transducer means to measure the level of said rich absorption medium accumulated in said bottom portion of said absorption zone and to produce a 12th signal representative thereof;

establishing a 13th signal representative of the desired level of said rich absorption medium accumulated in said bottom portion of said absorption zone;

utilizing a level controller means to compare said 12th signal and said 13th signal and to produce a 14th signal representative of that comparison; and utilizing a control valve means to manipulate the flow rate of said rich absorption medium out of said bottom portion of said absorption zone in response to said 14th signal.

19. A method in accordance with claim 17 wherein said method for manipulating the venting of a portion of said vapor associated with said rich absorption medium from said flash tank means comprises:

utilizing a pressure transmitter means to measure the vapor pressure of said rich absorption medium in said flash tank means and to produce a 12th signal representative thereof;

establishing a 13th signal representative of the desired vapor pressure of said rich absorption medium in said flash tank means;

utilizing a pressure controller means to compare said 12th signal and said 13th signal and to establish a 14th signal representative of that comparison; and utilizing a control valve means to manipulate the venting of a portion of said vapor associated with said rich absorption medium from said flash tank means in response to said 14th signal.

20. A method in accordance with claim 17 wherein said method for manipulating the flow rate of said rich absorption medium into said stripping zone comprises:

utilizing a level transducer means to measure the level of said rich absorption medium in said flash tank means and to produce a 12th signal representative thereof;

establishing a 13th signal representative of the desired level of said rich absorption medium in said flash tank means;

utilizing a level controller means to compare said 12th signal and said 13th signal and to establish a 14th signal representative of that comparison; and utilizing a control valve means to manipulate the flow rate of said rich absorption medium into said stripping zone in response to said 14th signal.

21. A method in accordance with claim 17 wherein said method for manipulating the venting of a portion of said vapors from said accumulator means comprises:

utilizing a pressure transmitter means to measure the vapor pressure of said partially condensed stripping zone overhead stream in said accumulator means and to produce a 12th signal representative thereof;

establishing a 13th signal representative of the desired vapor pressure of said partially condensed stripping zone overhead stream in said accumulator means;

utilizing a pressure controller means to compare said 12th signal and said 13th signal and to establish a 14th signal representative of that comparison; and utilizing a control valve means to manipulate the venting of a portion of said vapor associated with said partially condensed stripping zone overhead stream from said accumulator means in response to said 14th signal.

22. A method in accordance with claim 17 wherein said method for manipulating the flow rate of said condensate into said absorption zone comprises:

utilizing a level transducer means to measure the level of said condensate in said accumulator means and to produce a 12th signal representative thereof;

establishing a 13th signal representative of the desired level of said condensate in said accumulator means;

utilizing a level controller means to compare said 12th signal and said 13th signal and to establish a 14th signal representative of that comparison; and utilizing a control valve means to manipulate the flow rate of said condensate into said stripping zone.

23. A method in accordance with claim 17 wherein said method for manipulating the flow rate of said rich absorption medium into said surge tank means comprises:

utilizing a level transducer means to measure the level of said absorption medium in said reboiler means and to produce a 12th signal representative thereof;

establishing a 13th signal representative of the desired level of said lean absorption medium in said reboiler means;

utilizing a level controller means to compare said 12th signal and said 13th signal and to establish a 14th signal representative of that comparison; and utilizing a control valve means to manipulate the flow rate of said lean absorption medium into said surge tank means.

* * * * *

UNITED STATES PATENT AND TRADEMARK OFFICE
CERTIFICATE OF CORRECTION

PATENT NO. : 4,106,916

DATED : August 15, 1978

INVENTOR(S) : William F. Tuckett; Gary L. Funk; Dexter E. Smith

It is certified that error appears in the above-identified patent and that said Letters Patent are hereby corrected as shown below:

Column 10, line 48, claim 8, after "comparing" and before "12th" change "with" to -- said --.

Signed and Sealed this

Fourth Day of September 1979

[SEAL]

Attest:

LUTRELLE F. PARKER

Attesting Officer     Acting Commissioner of Patents and Trademarks